March 22, 1960 W. G. HOAG ET AL 2,929,528
TELESCOPIC STAY FOR AUTOMOTIVE VEHICLE LIFT GATE AND THE LIKE
Filed May 15, 1958
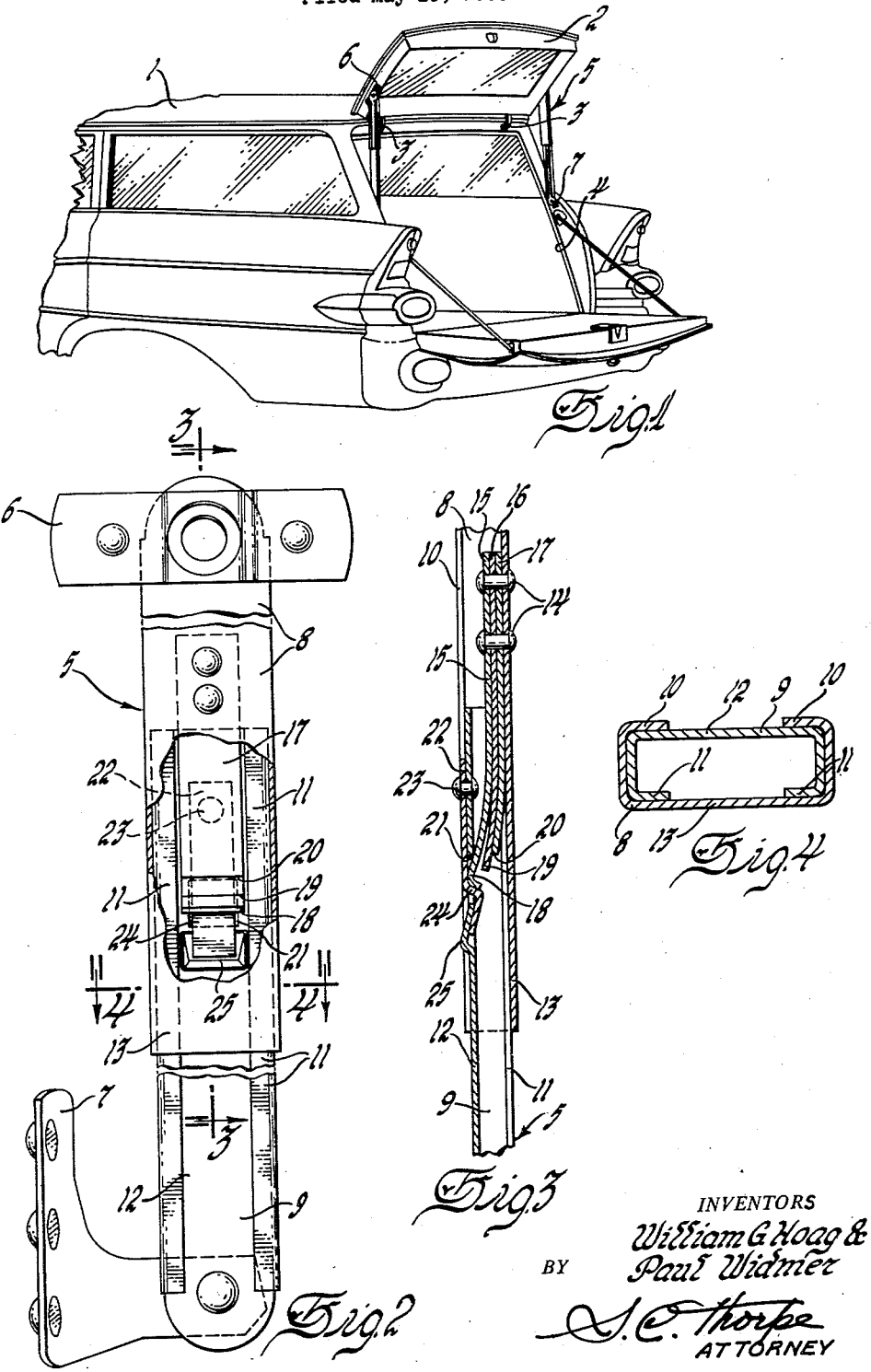
INVENTORS
William G. Hoag &
Paul Widmer
BY
J. C. Thorpe
ATTORNEY

United States Patent Office 2,929,528
Patented Mar. 22, 1960

2,929,528

TELESCOPIC STAY FOR AUTOMOTIVE VEHICLE LIFT GATE AND THE LIKE

William G. Hoag, Grosse Pointe Farms, and Paul Widmer, Detroit, Mich., assignors to General Motors Corporation, Detroit, Mich., a corporation of Delaware Application May 15, 1958, Serial No. 735,525

1 Claim. (Cl. 217—60)

This invention relates to telescopically contractible stays such as are employed, for example, to support lift gates in open position on station wagons, trucks and other automotive vehicles.

An improved stay is provided in accordance with the invention comprising friction detent means which is automatically operable to hold the telescoping links extended when the lift gate is raised to open position, and which will automatically disengage to permit telescopic collapse of the links upon application of added manual closing force on the lift gate. The detent means consists of a spring latch in the preferred form of a main cantilever leaf spring with reinforcing shorter spring leaves carried by one of the telescoping links, and a keeper on the other link with which the free end of the main spring is engageable as a pawl. In their preferred form, the links are oppositely presenting channel section pieces and the latch and keeper parts are mounted to the webs of the respective channel sections so as to project internally of the assembly for protection and compactness of design.

The invention will be further described with reference to the attached drawing, showing a preferred embodiment thereof, wherein:

Figure 1 is an elevational side view of the rear end of an automotive vehicle of the so-called "station wagon" type, illustrating application of the stay for releasably supporting the lift gate.

Figure 2 is an enlarged side elevational view of the stay, with parts broken away and in section.

Figure 3 is a fragmentary longitudinal sectional view taken substantially along the line 3—3 of Figure 2.

Figure 4 is a further enlarged sectional view taken substantially along the line 4—4 of Figure 2.

Referring now in detail to the drawing, an automotive station wagon vehicle 1 is illustrated having a rear lift gate 2 which is swingable about hinged means 3 from its open position shown to a closed position in which the gate is coplanar with the rear opening 4 in the vehicle body. The numeral 5 designates generally the telescopic stay which operates to support the lift gate 2 in open position, the respective opposite ends of the stay being pivotally connected to mounting brackets 6 and 7 respectively attached to the side frames of the body and lift gate.

As shown in Figures 2-4, the stay comprises two telescopically interfitting links, each of generally channel shape section. Of these, the outer link 8 has its channel section in oppositely presenting relation to the inner link 9, and each has its channel side walls flanged inwardly along their free edges as at 10, 11, to slidably bear against the channel webs 12, 13. Disposed longitudinally within the outer link and secured to its web 13 as by rivets 14 is a latch in the form of a plurality of spring leaves 15, 16 and 17 whose opposite ends extend cantilever-wise into the inner link between its flanges 11. The most remote leaf 15 from the web 13 terminates at its free end to form a pawl 18 which normally bears resiliently against the inner surface of the inner link web 12 and thus acts to bias the inner link against the side flanges 10 of the outer link and thereby take up all transverse clearance between the links for anti-rattle purposes. The other spring leaves 16 and 17 serve to reinforce the pawl forming spring 15 to increase its load/deflection rate, however the free ends 19, 20 of these reinforcing leaves terminate short of the latch portion 18 and in spaced relation to the adjacent portion of the spring leaf 15 so that initial movement of the pawl 18 in the unlatching direction is substantially unopposed by the leaves 16, 17.

An opening 21 is provided in the web 12 of the inner link at a point longitudinally thereof which is opposite the latch pawl 18 when the links are in their extended position shown in Figures 2 and 3. Keeper means for engagement by the latch is carried by the inner link 9, and comprises a strap-like element 22. One end of this strap is disposed between and in the plane of the two in-turned flanges 10 of the outer link, and fixed as by the rivet 23 to the inner link web 12. Intermediate the ends of this strap is an offset bent portion 24 which extends through the opening 21 and forms a keeper surface for latchably engaging the pawl 18. The opposite end of the strap lies in abutting engagement with an embossment 25 of the inner link web 12 which supports it against displacement by the pawl 18. The bend at 24 in this keeper strap element is at such angle shown to the longitudinal plane of the web 12 that sufficient frictional resistance is imposed to inward movement of the pawl 18 as will support the stay in extended position only under the normal load of the weight of the lift gate in raised position. Additional load applied by manually forcing the lift gate in the closing direction causes the pawl to over-ride the keeper portion 24.

Forming the keeper means as an element non-integral with the inner link 9, as described, has the advantage of enabling the selection of a harder, more wear resistant material than would otherwise be afforded by the material of the inner link 9. The over-all ruggedness of the stay is also enhanced by the stacked spring leaf arrangement described, which enables obtaining the desired "hold-open" capacity by strengthening the spring 15 without increasing its deflection.

While only a single preferred embodiment of the invention has been disclosed, it is appreciated that numerous minor changes in the construction and arrangement of the parts may be made without departing from the spirit and scope of the invention as hereinafter claimed.

We claim:

In a contractible stay, the combination of two channel section links in longitudinally telescoping relation, the channel sections of said links being in oppositely presenting relation and each having in-turned flanges along their free edges bearing on the channel web of the other link, a plurality of spring leaves secured in stacked relation at one end to the inner surface of the channel web of the outer link and extending into the inner link between its side wall flanges, the most remote of said leaves from said outer link web having its extended end terminating beyond the extended ends of the remaining leaves and normally bearing against the web of the inner link, said inner link web having an opening, and a keeper element in the form of a rigid strap having one end disposed between and in the plane of the outer link flanges, said one end of the strap being secured to the inner link web on one side of said opening therein, said strap having a bent section intermediate its ends extending through said opening to latchably engage the extended end of said most remote leaf when the stay is extended, the opposite end of said strap terminating in abutment with the inner surface of the inner link on the opposite side of the opening.

References Cited in the file of this patent

UNITED STATES PATENTS

| | | |
|---|---|---|
| 1,199,295 | Morrison | Sept. 26, 1916 |
| 1,221,751 | Lane | Apr. 3, 1917 |
| 2,221,123 | Wiley | Nov. 12, 1940 |
| 2,231,550 | Schallis | Feb. 11, 1941 |
| 2,288,925 | Simpson | July 7, 1942 |

FOREIGN PATENTS

| | | |
|---|---|---|
| 366,075 | Great Britain | Jan. 28, 1932 |